United States Patent [19]

Hall et al.

[11] Patent Number: 5,550,740
[45] Date of Patent: Aug. 27, 1996

[54] PROCESS AND DEVICE FOR CONTROLLING AN INTERNAL COMBUSTION ENGINE

[75] Inventors: Dieter Hall, Vienna, Austria; Klaus Sassen, Schwieberdingen, Germany

[73] Assignee: Robert Bosch GmbH, Stuttgart, Germany

[21] Appl. No.: 349,224

[22] Filed: Dec. 5, 1994

[30] Foreign Application Priority Data

Dec. 4, 1993 [DE] Germany ............... 43 41 434.6

[51] Int. Cl.⁶ ............... G01M 15/00; F02D 41/22
[52] U.S. Cl. ............... 364/431.01; 324/379; 73/116; 123/339.23; 123/571
[58] Field of Search ............... 123/417, 480, 123/339.23, 571; 364/431.01, 431.04, 431.05; 73/116, 117.3; 324/379, 384

[56] References Cited

U.S. PATENT DOCUMENTS

| | | | |
|---|---|---|---|
| 4,267,569 | 5/1981 | Baumann et al. | 364/431.01 |
| 4,399,407 | 8/1983 | Kling et al. | 324/379 |
| 4,476,531 | 10/1984 | Marino et al. | 364/431.01 |
| 5,189,907 | 3/1993 | Marino et al. | 73/116 |
| 5,243,852 | 9/1993 | Morita | 73/117.3 |

FOREIGN PATENT DOCUMENTS

| | | |
|---|---|---|
| 2824190A1 | 12/1979 | Germany. |
| 3802241 | 8/1989 | Germany. |
| 4019958 | 1/1991 | Germany. |
| 4112588 | 10/1991 | Germany. |
| 9211939.5 | 12/1992 | Germany. |

*Primary Examiner*—Willis R. Wolfe
*Attorney, Agent, or Firm*—Kenyon & Kenyon

[57] ABSTRACT

A process and a device for controlling an internal combustion engine in which a control unit is temporarily connected to an external tester via an interface. At least one storage device of the control unit is configured as first and second storage elements. The first storage element is supplied with data corresponding to a signal transmitted from the tester. The second storage element is supplied with data from the control unit. Either the contents of the first storage element or the contents of the second storage element are selected, with the contents of the second storage element being selected when the contents of the first storage element have an unallowable value.

9 Claims, 2 Drawing Sheets

PROCESS AND DEVICE FOR CONTROLLING AN INTERNAL COMBUSTION ENGINE

FIELD OF THE INVENTION

The present invention relates to a method and apparatus for controlling an internal combustion engine. More specifically, the present invention relates to a method and apparatus for controlling an internal combustion engine using a control unit which can be coupled to an external testing device.

BACKGROUND INFORMATION

German Published Patent Application No. 28 24 190 (corresponding to U.S. Pat. No. 4,267,569) describes a process and equipment for controlling an internal combustion engine. The aforementioned reference describes two schemes for verifying the operation of an engine control device. In one scheme, a diagnostic subprogram is stored in an auxiliary storage space. When this diagnostic subprogram is run, different test points are polled and their responses checked. In another scheme, diagnostic means are provided that have a control device and a storage device. In this embodiment, the diagnostic subprogram is stored only in the storage device of the diagnostic means and is processed by said means.

The aforementioned schemes have the disadvantage that considerable storage space is needed, or the external diagnostic means can only be used for a certain control device type. If modifications are to be made, especially during the diagnostic procedure, the entire control device must be modified, in the case of the first scheme, or the diagnostic means must be fully reconfigured, in the case of the second scheme.

SUMMARY OF THE INVENTION

An object of the present invention is to provide a flexible way of verifying the operation of an internal combustion engine control device. In particular, a more flexible actuator test is made possible with the help of an external testing means.

With the method of the present invention, it is possible to arbitrarily modify the testing procedures without modifying the control device. The external testing means, which can be implemented, for example, with a microcomputer, can provide, for at least one user, a wide variety of control signals, such as control signals for actuators and/or warning lights, desired values for control circuits, or test signals for sensors. The control signals and the control times can be provided by the external tester in a flexible manner. Furthermore, the external testing means can simultaneously control a plurality of actuators. In addition, functional chains can be simulated by the testing means, in which case the testing means controls different actuators consecutively, and/or it controls one actuator with different signals and evaluates the system reactions.

DETAILED DESCRIPTION OF THE DRAWINGS

Figure 1:
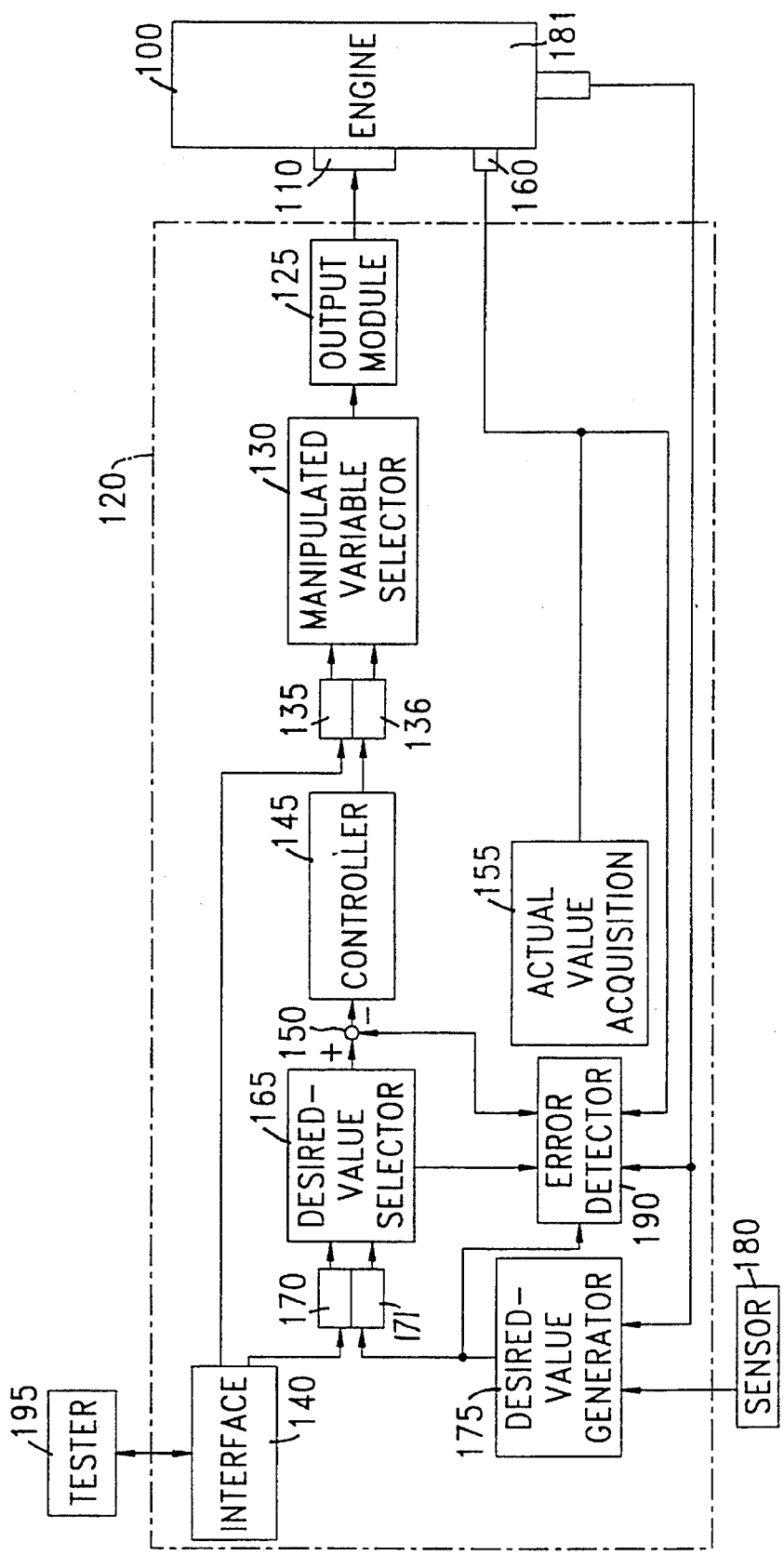
FIG. 1 is a schematic representation of a control means for an internal combustion engine, in accordance with the present invention.

FIG. 1 schematically shows a control device, in accordance with the present invention, for controlling an internal combustion engine 100. Various parameters of the internal combustion engine can be influenced using one or more actuators 110. Thus, for example, actuators can be provided for influencing the power output of the internal combustion engine. In the case of diesel internal combustion engines, the actuators may be solenoid valves determining the amount of injected fuel, actuators for actuating the control rod, or an adjusting lever. In the case of internal combustion engines with external ignition, the one or more actuators 110 may include an actuator for actuating a throttle valve. Furthermore, actuators for influencing, for example, the ignition point, the injection start, or the exhaust recirculation rate may also be provided.

The one or more actuators 110 are controlled by a control unit 120, preferably through an output module 125. The output module 125 is connected to a manipulated-variable selector 130. The manipulated-variable selector 130 selects the contents of a first storage element 135 or of a second storage element 136. The contents of the first storage element 135 are supplied from an interface 140 which can be coupled to an external tester 195. The second storage element 136 is supplied with the output signal of a controller 145. In known systems, only one storage means is provided where the manipulated variable or the output signal of the controller is stored. In accordance with the present invention, such a storage means is configured as twin storage elements.

The output signal of a summing node 150 is supplied to the controller 145 as an input signal. The summing node 150 receives, with a negative sign, the output signal of an actual-value acquisition means 155, to which, in turn, the output signal of a sensor 160 is supplied. The sensor 160 is preferably located in the area of the internal combustion engine 100 and senses, for example, the actual position of an actuator 110.

The output signal of a desired-value selector 165 is supplied, with a positive sign, to the second input of the summing node 150. The desired-value selector 165 processes the contents of a first storage element 170 and a second storage element 171. The first storage element 170 is supplied with signals from the interface 140. The output signal of a desired-value generator 175 is supplied to the second storage element 171. The desired-value generator 175 processes signals from sensors 180 and 181. The sensor 181 is preferably located on the internal combustion engine 100 and senses, for example, the rotational speed of the internal combustion engine.

In an advantageous embodiment of the present invention, the control unit 120 includes an error detector 190. The error detector 190 is supplied with various signals which may include the output signals of the sensors 160 and 181, the output signal of the desired-value generator 175, as well as the output signal of either the desired-value selector 165 or the manipulated-variable selector 130.

The operation of the device of the present invention, as used for example to control engine idling, will now be described, first under normal operating conditions as when no external tester is attached.

Based on various operating parameters monitored by the sensors 160, 180, and 181, the desired-value generator 175 computes a desired value for the idling speed. The operating parameters of the internal combustion engine include, for example, rotational speed, engine temperature, or environmental conditions such as accelerator pedal position, external air temperature and/or other parameters. The desired-value generator 175 writes a value corresponding to the desired idling rotational speed into the second storage element 171. The desired-value selector 165 selects either the contents of the first storage element 170 or of the second storage element 171. If no value is found in the first storage element 170, the desired-value selector 165 uses the contents of the second storage element 171, i.e., the desired value provided by the desired-value generator 175. In summing node 150, the desired value is compared with an actual value which is provided as an output signal of the actual-value acquisition means 155. For this purpose, the actual-value acquisition means 155 analyzes the output signal of a rotational speed sensor 160.

From the result of the comparison in the summing node 150, the controller 145 determines a manipulated variable to be supplied to the actuator 110, which in this example would be a servomotor for adjusting the control rod. The manipulated variable preferably represents a voltage signal which is to be applied to the servomotor for adjusting the control rod. This value is written into the second storage element 136 by the controller 145.

Like the desired-value selector 165, the manipulated-variable selector 130 selects the contents of one of two storage elements, in this case, either the contents of the first storage element 135 or of the second storage element 136. The selected contents are then supplied to the output module 125 which applies the corresponding voltage signal to the actuator or sets the voltage applied.

A procedure for checking the operation of the control unit 120 or of the one or more actuators 110 will now be described.

The external tester 195 is first connected to the interface 140. The external tester 195 is capable of activating the actuators present, as well as of detecting and analyzing the system's reactions. The tester 195 provides the actuation time, defined by the beginning and end of actuation, and/or the actuation parameters for one or more actuators. Thus, for example, the tester 195 determines that the idling speed must be increased to a certain desired value. The interface 140 converts the signal from the external tester 195 into a signal that is compatible with the control unit. In this case, the interface 140 converts the desired rotational speed value from the tester 195 into a corresponding desired value for the controller 145 and writes this value into the first storage element 170. When a value is written into the first storage element 170, the desired-value selector 165 selects this value and the controller 145 sets the speed to this value.

The tester 195 may also determine a position for the actuator 110. In this case, the interface 140 converts the desired position signal into a corresponding actuation signal for the actuator, for example, a voltage signal or a pulse duty factor. This value is then written into the first storage element 135. Like the desired-value selector 165, the manipulated value selector 130 selects this value and supplies the output module 125 with the corresponding voltage or pulse duty factor.

The process of the present invention was described above using the example of a rotational speed controller. The present invention, however, is not limited to this application. It is also possible to provide only the desired value or only the manipulated variable via the interface. Furthermore, it is conceivable that a plurality of actuators could be actuated by the tester 195 via the interface 140. Furthermore, a display means, in particular a warning light, could be actuated instead of an actuator. In principle, all values may be available in the control unit or stored in a storage element and addressed via the interface 140 accordingly. The tester 195 can then analyze the reaction of the system consisting of the control unit 120, the one or more actuators 110, the internal combustion engine 100, and the sensors. Thus, it is also possible, for example, that certain signals be provided as sensor signals in order to check the system reaction.

In an advantageous embodiment of the present invention, the control unit 120 includes an error detector 190. The error detector 190 analyzes the output signals of a plurality of sensors. In addition, desired values and/or control signals are supplied to the error detector 190. The error detector 190 checks these various signals for plausibility. In order to prevent an implausible operating condition from occurring, when the tester 195 provides signals via the interface 140, the desired-value selector 165 and the manipulated value selector 130 transmit a corresponding signal when the value of the first storage element is selected.

In an advantageous embodiment of the present invention, the tester 195 addresses a plurality of storage elements via the interface 140. This enables the tester to perform independent actuator tests and functional chains. In this case, a plurality of actuators are successively or simultaneously controlled by the tester 195 via the interface 140 and/or the tester provides desired values via the interface 140. At the same time, measured values are supplied to the tester 195 via the interface 140. The tester analyzes the corresponding reactions. The tester 195 thus checks whether providing a certain signal via interface 140 triggers a corresponding reaction of the measured values. These functional chains are used, for example, in final vehicle testing or workshop diagnosis.

Figure 2:
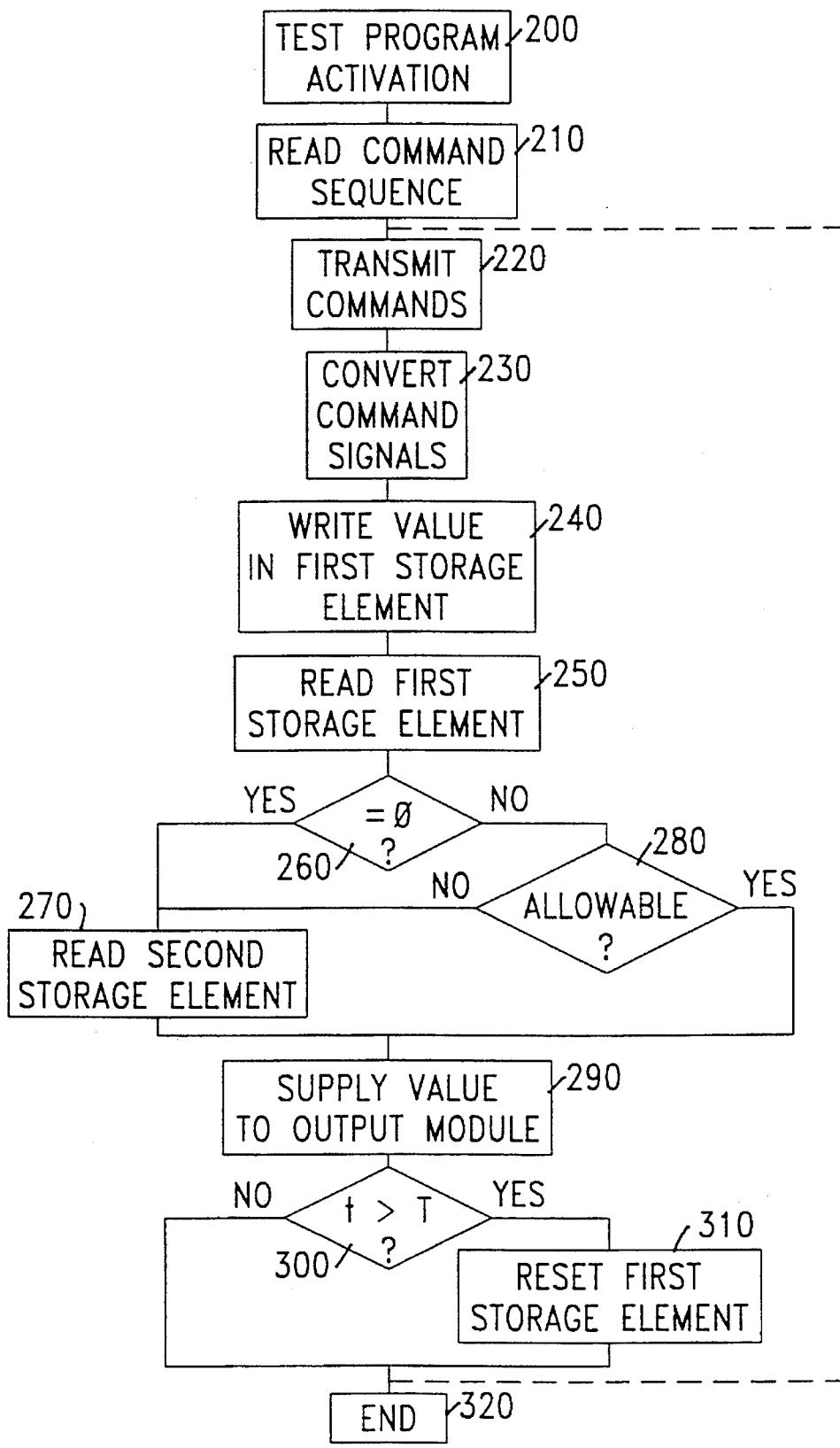
FIG. 2 shows a flow diagram illustrating the procedure according to the present invention.

For further clarification, the method of the present invention will now be described with reference to the flow chart of FIG. 2. For purposes of illustration, an exhaust recirculation actuator test will be described.

In a first step 200, test programs are activated in the tester 195 via input means. Thus, for example, a test program for checking the exhaust gas recirculation actuator is activated. In step 210, the tester 195 reads the required command sequence from its storage. These commands are then transmitted in step 220 to the interface 140 in a sequence and in time intervals stored in the tester 195. Thus the tester 195 may send to the interface 140 a signal indicating that the exhaust gas recirculation actuator is to cut off exhaust gas recirculation.

In step 230, the interface 140 converts the signal from the tester 195 into a value corresponding to a desired pulse duty factor of a signal to be generated for controlling the exhaust gas recirculation actuator. In step 240, the interface 140 writes the value corresponding to the desired pulse duty factor into the first storage element 135. In step 250, the manipulated-variable selector 130 reads the contents of the first storage element 135. At decision step 260, the value stored in the first storage element is checked to determine whether it is zero. If the value of the first storage element is zero, i.e., no value is written in the storage 135, then the content of the second storage element 136 is read in step 270, and subsequently supplied to the output module in step 290. If the content of the first storage element 135 is not equal to zero, operation branches to decision step 280 where the value of the first storage element 135 is checked to determine whether it is allowable. If it is not allowable, step 270 follows. If the value read from the first storage element 135 is allowable, it is supplied to the output module 125 in step 290. If the storage element contains the value zero, it is considered to have a non-allowable value.

If an allowable value is stored in the first storage element, it is used for control. If a non-allowable value is stored in the first storage element, the value of the second storage element is used for control. Thus it can be ensured that the value of the first storage element, which is supplied by the tester 195, has priority over the value of the second storage element.

The subsequent decision step 300 checks whether the values of the storage elements have resided in the storage elements for longer than a certain predefined time T. If this is the case, the value of the first storage element is reset to zero in step 310 and the program ends at step 320 or loops back to step 220, where a new command is transmitted from the tester 195. Otherwise, the program ends at step 320.

The logic required for controlling the actuator test is stored in the tester 195 and controlled by the tester. The functional chains and testing procedures can be easily modified in the tester. The control device only converts the signals provided by the tester into control signals. The process can be modified, however, without modifications to the control unit 120. It is only necessary that certain storage elements of the control unit be configured as twin elements. Thus the values are written by the tester in one of the two storage elements.

The tester 195 is preferably implemented as a microcomputer (e.g., a personal computer). Thus the programs can be readily modified in the tester 195. Such a modification of the testing procedure is much harder to carry out in a case where the tester is integrated into the control unit 120. In that case, the control unit 120 must be modified accordingly.

What is claimed is:

1. A method for controlling an internal combustion engine, comprising the steps of:

coupling a control unit to a tester via an interface;

storing, in a first storage element, data corresponding to control signals transmitted by the tester;

storing, in a second storage element, data from the control unit;

determining whether the data stored in the first storage element is allowable;

selecting the data stored in the first storage element if the data stored in the first storage element is allowable, otherwise selecting the data stored in the second storage element; and controlling the engine using the selected data.

2. The method according to claim 1, wherein the step of controlling the engine includes the step of controlling an output module using the selected data.

3. The method according to claim 1, further comprising the step of using the selected data as a desired value for a control circuit.

4. The method according to claim 1, wherein the data corresponding to control signals transmitted by the tester is generated by converting the control signals transmitted by the tester into signals compatible with the control unit.

5. The method according to claim 1, wherein the tester transmits the control signals and control times for at least one actuator.

6. The method according to claim 1, wherein the tester transmits at least one desired value for at least one control circuit.

7. The method according to claim 1, wherein the tester provides a functional chain.

8. The method according to claim 1, wherein no error monitoring is performed if the data stored in the first storage element is selected.

9. A control unit for controlling an internal combustion engine, comprising:

an interface for coupling the control unit to a tester;

at least one storage device configured as first and second storage elements;

means for supplying the first storage element with first data corresponding to at least one control signal transmitted by the tester;

means for supplying the second storage element with second data from the control unit; and means for selecting the first data if the first data is allowable, otherwise selecting the second data, wherein the selected data is used to control the engine.

* * * * *